US005285315A

United States Patent [19]

Stiles

[11] Patent Number: 5,285,315

[45] Date of Patent: Feb. 8, 1994

[54] APPARATUS AND METHOD FOR OPTIMIZING USEFUL SUNLIGHT REFLECTED INTO A ROOM

[75] Inventor: Michael R. Stiles, Syracuse, N.Y.

[73] Assignee: Synertech Systems Corporation, Syracuse, N.Y.

[21] Appl. No.: 950,960

[22] Filed: Sep. 25, 1992

[51] Int. Cl.[5] .................... G02B 17/00; G02B 27/00

[52] U.S. Cl. .................... 359/592; 359/596

[58] Field of Search .............. 359/591, 592, 595, 596, 359/597, 598

[56] References Cited

U.S. PATENT DOCUMENTS 3,423,148 1/1969 Reboul .
3,904,866 9/1975 Hayes .
4,509,825 4/1985 Otto et al. .................. 350/259
4,557,565 12/1985 Ruck et al. .................. 350/262
4,559,925 12/1985 Snow .................. 126/430
4,593,976 6/1986 Eijadi .................. 350/260
4,630,892 12/1986 Howard .................. 350/264
4,634,222 1/1987 Critten .................. 350/263
4,699,467 10/1987 Bartenback et al. .................. 350/259
4,706,649 11/1987 Hager .................. 126/419
4,989,952 2/1991 Edmonds .................. 350/259
5,204,777 4/1993 Curshod .................. 359/596

*Primary Examiner*—Richard A. Wintercorn
*Attorney, Agent, or Firm*—Charles S. McGuire

[57] ABSTRACT

A comprehensive method, and apparatus implementing the method, for providing beam daylighting to a room by one or more reflectors positioned in a window wall of the room. The method involves a mathematical analysis of solar and reflected beam vectors and in determining the optimum orientation of a vector normal to the reflecting surface to provide the best combination of depth of penetration of light into the room while keeping glare to an acceptable level. Arrays of both stationary and moveable reflectors implementing the method are disclosed. In the case of stationary arrays, preferably two are provided in each installation which respectively optimize performance of reflections during periods when the solar beam vector is on the easterly ana westerly sides of a line perpendicular to the window wall. All reflectors are positioned with the vector normal thereto oriented with three nonzero components in a rectangular coordinate system related to the plane of the window wall and taking into consideration the site latitude.

52 Claims, 4 Drawing Sheets

APPARATUS AND METHOD FOR OPTIMIZING USEFUL SUNLIGHT REFLECTED INTO A ROOM

BACKGROUND OF THE INVENTION

The present invention relates to apparatus for installation in an opening in a building wall or roof for the purpose of enhancing interior illumination by reflected sunlight, and to methods of determining the optimum orientation of reflectors to achieve maximum depth of penetration of reflected light into the area to be illuminated with acceptably low glare. In general terms, the invention relates to improvements in the technology commonly known as "beam daylighting."

Since the invention of the light bulb ana common availability of electrical power, most buildings have been designed under the assumption that electricity will supply interior illumination by way of lighting fixtures, and that it is unnecessary to rely upon natural light for most or all illumination purposes. Over the more recent past, this assumption has been challenged on several grounds. First, artificial lighting doesn't meet the needs of most visual tasks as well as does the broader spectral distribution of natural sunlight. Also, the luminous efficacy of natural light (around 113 lumens/watt) is substantially higher than that of all commonly-used luminaries (over twice that of fluorescents and eight times incandescents). In consequence, using natural light to meet illumination needs in buildings not only supplants electricity that would otherwise be used to power artificial light fixtures, but also lowers air conditioning loads. Thus, given good daylighting designs, the use of natural light is highly advantageous for a number of reasons.

As used herein, and generally in the field of interest, the term "beam daylighting" denotes the use of one or more light-reflecting surfaces which redirect the path of sunlight entering an enclosed area for visual or other illumination purposes. Among the prior art beam daylighting designs are those exemplified by U.S. Pat. Nos. 4,509,825, 4,630,8920, 4,634,222, 4,699,467 and 4,989,952. Some of the previously devised systems employ stationary reflectors, while others include means for moving the reflecting surfaces to track solar position. Planar, parabolic, and other configurations of reflecting surfaces have been used in beam daylighting applications, as have systems involving reflection of incoming light from two or more surfaces in distributing the light at the desired location. In any case, the reflecting surfaces have a longitudinal axis which, in all known prior art systems, is oriented either horizontally or vertically. As will be shown, optimum performance can be achieved only when the longitudinal axis of a single reflecting surface is oriented somewhere between horizontal and vertical. This is true whether the reflectors are fixedly installed, with their orientation providing optimized performance averaged over the period between successive solstices, or are movable to maintain optimized performance over a range of varying solar positions.

While it is generally recognized that orientation of the reflecting surface(s) should provide adequate lighting in all portions of the area to be illuminated (hereafter referred to for convenience as the room), prior art daylighting systems fail to adequately consider both the spatial and the temporal aspects of reflector orientation. That is, reflector performance must take into consideration both the distance of light penetration into the room and the level of glare in the area illuminated. Other design features, such as the relative cost, suitability for incorporation into existing structures, aesthetic appearance of the installed system, maintenance requirements, etc., are also often severely compromised or ignored.

Objects of the present invention are:

to provide a novel and improved beam daylighting system which fully or partially replaces artificial light with natural light at an acceptably low glare level;

to provide a method of determining optimal orientation of reflecting surfaces at a given site location to maximize distance of penetration of reflected light into a room (e.g., up to 30 feet) while eliminating or minimizing glare;

to provide beam daylighting structure wherein stationary reflecting surfaces are oriented to optimize room illumination at a given latitude when positioned in a wall or roof opening facing in a predetermined compass direction;

to provide a daylighting system which is easy to maintain, suitable for installation in both new and existing buildings, and compatible with a variety of residential, commercial, institutional and industrial environments;

to provide a highly effective daylighting system which, in a first embodiment, has no moving parts, is completely passive and functions without user interaction; and to provide a daylighting system which, in a second embodiment, includes novel structural and operational components which reorient the reflector surfaces during periods when they receive direct sunlight to optimize the effectiveness of the system in terms of sending the reflected light in a desired direction.

Other objects will in part be obvious and will in part appear hereinafter.

SUMMARY OF THE INVENTION

In accordance with the foregoing objects, the invention contemplates a mathematical analysis of the solar-related orientation of a light-reflecting surface within a rectangular coordinate system, taking into account the latitude of the site and the facing compass direction of the wall opening wherein the reflector is mounted. One aspect of the invention is concerned with a unique method for mutually relating solar position, reflector orientation, physical orientation of a building space and direction of reflected light within the space. Directional properties of solar reflections are quantified within a coordinate system which relates the direction of the incoming and reflected beams to the orientation of the reflector with respect to three mutually perpendicular axes, one of which is fixed and predetermined by the compass direction in which building opening wherein the reflector is mounted faces. The ref lector has a longitudinal axis which, as dictated by the method of optimizing reflector performance, is never oriented horizontally or vertically, in contrast to prior art reflector orientations.

The method is implemented in a first embodiment by a reflector positioned in an opening such as a window or skylight which receives direct sunlight during at least a portion of the daylight hours. At least one such reflector is positioned to reflect light to the portion of the room farthest from the reflector and, in the usual installation, additional ref lectors will be positioned to distribute the light to other areas of the room. For convenience of construction, as well as to provide a number of other desirable features, the reflectors are preferably positioned with all of their longitudinal axes in a single plane between two parallel, transparent panes.

Preferably, each window or other opening equipped with reflectors includes at least one positioned for optimal reflection in the desired manner while receiving direct sunlight when the sun is on one side of a line perpendicular to the window surface, and at least one other positioned for optimal reflection while receiving direct rays with the sun on the other side of such line. These are termed the ante-elevation and post-elevation sides of the window wall.

In a first embodiment, the reflectors are fixedly positioned and oriented to provide the best performance averaged over the period between successive solstices. In a second embodiment, the reflectors are movable about each of two perpendicular axes to change orientation with changes in solar position. In each case, optimum reflector orientation is established according to the method of the invention, performance of the reflectors being defined and optimized in terms of both spatial and temporal components.

DETAILED DESCRIPTION

Figure 1:
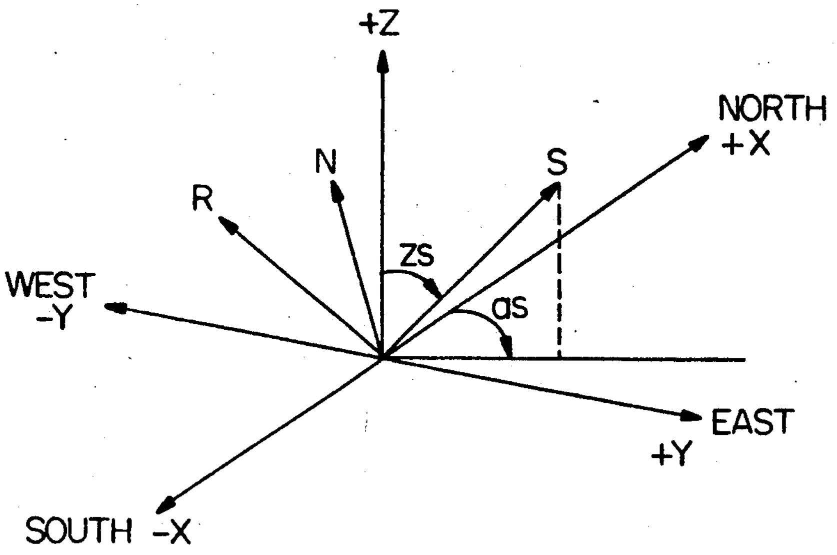
FIG. 1 is a diagram of the coordinate system and unit vectors for specifying specular reflection of sunlight.

The present invention may be best understood in the context of certain conventions and rules which relate the direction of a solar beam to the orientation of a reflecting surface and thus to the direction of the reflected beam. Useful examples of such conventions and rules are found in *Solar Engineering of Thermal Processes* by Duffie & Beckman, John Wiley & Sons, 1980, and "Recommended Practice for the Calculation of Daylight Availability", by DiLaura, *Journal of the Illuminating Engineering Society,* July, 1984 (pp. 381-392). The rules for specular reflection are imposed on a set of unit vectors having their tails at the origin of a three-dimensional coordinate system. In accordance with conventional practise, letters representing vector quantities are printed in bold type. The rules relevant to the present discussion, with reference to the coordinate system and vectors of FIG. 1, are: 1. the angle between n and r is the same as the angle between n and s, and 2. the vectors s, n and r all occur in the same plane. Vectors s and r are the central lines of rays or "pencils" of incident and reflected light, respectively, at the specular surface whose normal is n.

In the coordinate system of FIG. 1, the x-y plane is horizontal with the axes pointing in the four major compass directions, +x and −x pointing north and south, and +y and −y east and west, respectively. The +z and −z axes extend vertically upward and downward, respectively. Azimuth angles are measured from 0 to 360 degrees, clockwise from the +x axis, and zenith angles are measured clockwise from the +z axis. The unit vector labelled s represents the instantaneous position of the sun with respect to the origin of the coordinate system. The azimuth angle (as) and zenith angle (zs) of the vector s are indicated in FIG. 1, the azimuth angle being the angle between the x axis and the projection of s in the xy plane.

The direction of a unit vector can be specified by direction cosine values within the coordinate system. For the unit vector s, for example, direction is specified as:

$$s = sx\,i + sy\,j + sx\,k \quad (1)$$

The direction cosine values can be expressed in terms of a vector's zenith and azimuth angles, which for the example of the vector s are:

$$sx = \sin(zs)\cos(as) \quad (2a)$$

$$sy = \sin(zs)\sin(as) \quad (2b)$$

$$sz = \cos(zs) \quad (2c)$$

Analogous expressions apply to the vectors n and r. In the case of stationary reflectors, only the vectors s and r have direction cosine values that are time-dependent. The time-varying components of the solar vector can be derived from the standard equations for the position of the sun (DiLaura, supra), and are:

$$sx = D + E\cos(w) \quad (3a)$$

$$sy = C\sin(w) \quad (3b)$$

$$sz = A - B\cos(w) \quad (3c)$$

where:

$$A = \sin(1)\sin(d) \quad (4)$$

$$B = \cos(1)\cos(d) \quad (5)$$

$$C = \cos(d) \quad (6)$$

$$D = \cos(1)\sin(d) \quad (7)$$

$$E = \sin(1)\cos(d) \quad (8)$$

The variable 1 in Equations (4), (5), (7) and (8) is site latitude. The variable d in Equations (4)-(8) is the declination and is computed as follows:

$$d = 0.4093\sin[((2\pi)(J-81)/368)] \quad (9)$$

where J is the Julian day of the year. Thus, the values of A through E will be constant for a given day of the year at a given site. The variable w in Equations (3a)-(3c) is the hour angle and is defined as:

$$w = \frac{\pi t}{12} \quad (10)$$

Solar time t in Equation (10) ranges from 0 hours to 24 hours.

The time-varying components of the vector r are functions of the components of s and n and must be computed explicitly. A method for calculating the components of r may be derived from the previously stated rules for specular reflection. The quantative formulations represented by Equations (1) through (10) are familiar to those in the daylighting field. The original work which follows results from applying the two general rules stated above in the coordinate system of FIG. 1.

As an example of implementing the rules for specular reflection in the coordinate frame of FIG. 1, assume that the components of s and of n are specified, and the problem is one of computing the components of r. Denoting the angle between s and n as A, the following three equations may be written using the vector dot product.

$$n \cdot r = nx\ rx + ny\ ry + nz\ rz = \cos(A) \quad (11)$$

$$s \cdot r = sx\ rx + sy\ ry + sz\ rz = \cos(2A) \quad (12)$$

$$V \cdot r = Vx\ rx + Vy\ ry + Vz\ rz = 0 \quad (13)$$

The vector V in Equation (13) is perpendicular to the plane that contains s, n and r and has components (Vx, Vy, Vz), which by definition can be found from the vector cross product having n as one of its terms. Vector V can be computed from the cross product of vectors s and n:

$$V = s \times n \quad (14)$$

The value of cos(A) in Equation (11) can be computed directly from the dot product of s and n. The value of cos (2A) in Equation (13) can then be found by using a trigonometric identity. From the given information, the only unknowns in equations (11)-(13) are (rx, ry, rz), and these components of the reflection vector may be found from simultaneous solution of the three equations. Note that this method may also be used to find the components of any one vector if the components of the other two vectors are given. The solutions to the relevant equations given above may be accomplished in closed form, by iterative search or by other approximation methods.

Based on the definitions and equations derived above, the following three steps will yield the components of the unit vector r that points in the direction of reflected sunlight:

step 1. specify the solar position with equations (8) through (10).

step 2. state the vector components of n in the coordinate system represented in FIG. 1.

step 3. solve the following system of equations for r:

$$n \cdot r = \cos(A)$$

$$s \cdot r = \cos(2A)$$

$$V \cdot r = 0$$

(from Equation (14), $V = s \times n$)

The components of the unit vector normal to a reflecting surface which will give a desired direction of reflected light may also be found from the definitions and equations derived above. The following three steps will yield the components of the unit vector n normal to the properly oriented reflecting surface.

step 1. specify the solar position with equations (8) through (10).

step 2. state the vector components of r (the desired direction of reflection) in the coordinate system represented in FIG. 1.

step 3. solve the following system of equations for n:

$$s \cdot n = \cos(A)$$

$$r \cdot n = \cos(A)$$

$$U \cdot n = 0$$

where $U = s \times r$

One of the principal problems with designing beam daylighting systems from stationary reflecting surfaces has been the lack of a way to rate the performance of a given orientation of reflector. The theory derived above makes it possible to define a performance rating f or a ref lector. In general, good performance is associated with the far penetration of reflected light into a room with little or no glare from the reflections at any time of the year. There is a trade-off between good light penetration into a room and glare. The present invention quantitatively defines performance rating for stationary reflectors that takes into account both light penetration and glare.

Assume a reflecting surface, or an array of reflectors, positioned in an opening (window) above usual eye level in a wall of a room in the northern hemisphere. The best possible zenith angle for reflections is 90° (i.e., the vector of the reflected beam is horizontal) because this allows the reflected beam to penetrate to the back walls of the room (assuming no obstructions) without striking the ceiling and without glaring down onto the occupants of the room.

Figure 2:
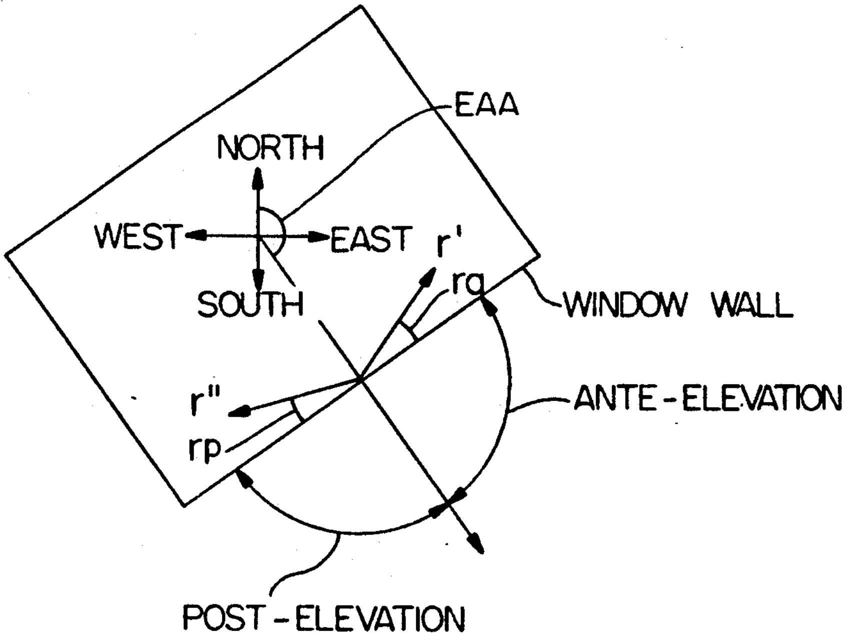
FIG. 2 is a diagram showing the physical orientation and azimuth angle conventions (floor plan) of a room used as an example in explaining the method of the invention.

The best azimuth angle for reflections can be expressed in terms of the conventions introduced in the floor-plan drawing of FIG. 2. First, the floor plan of the room is seen to occur in the xy plane of the coordinate system of FIG. 1. Second, the window wall faces a particular direction of the compass; the window wall in FIG. 2 happens to face southeast. Third, the perpendicular to the window wall is a direction in the coordinate system that has a specific azimuth angle. The azimuth angle made by the perpendicular to the window wall is termed the room's elevation azimuth angle, and is labelled EAA in FIG. 2.

In the present nomenclature of the daylighting field, the elevation azimuth angle is the angle in the horizontal plane (the earth's surface) made by the intersection of the horizontal plane with a plane perpendicular to a window (DiLaura supra). Elevation azimuth angle can assume a value from 0 to 360 degrees in the coordinate system and is a good way to express the compass direction towards which a window faces.

Returning to the performance of a reflector, it can be seen from FIG. 2 that one would want a reflected beam to enter the room in the direction of the perpendicular to the window wall. In other words, far penetration of the reflected light occurs when the azimuth angle of reflection equals the elevation azimuth angle of the windows. This constitutes good performance on the part of the reflector. Conversely, poor performance would be associated with reflections that shine along the margins of the window walls and with reflections that shine back outside the room.

In summary, the best performance of a reflector is one that gives a reflection having a zenith angle of 90° and an azimuth angle equal to the elevation azimuth angle of a room. This of course is an ideal situation and never will be realized for any prolonged periods with stationary reflectors. It is possible, however, to quantify how close the reflections from a given orientation of reflector come to the ideal condition. This is the basis for defining a performance function for a reflector, and the present invention is concerned with optimizing that performance function.

There is one additional set of conventions that facilitates the definition of performance, relative to solar position and the direction in which the room f aces. In FIG. 2, two angular ranges are indicated at the outside face of the window wall, one on each side of the perpendicular to the window wall. In the case of a planar wall, these angular ranges will be equal, 90° angles. Between the more easterly half of the window wall and the perpendicular to the window wall, the azimuthal positions of the sun can be said to be on the ante-elevation side of the window wall. Similarly, the azimuthal positions of the sun between the more westerly window wall and the perpendicular to the window wall can be said to be on the post-elevation side of the window wall. If the room happens to face due south, the ante-elevation and post-elevation azimuthal positions of the sun become the ante-meridian (a.m.) and post-meridian (p.m.) positions, respectively.

The distinction between ante- and post-elevation positions of the sun are important for the following reasons. First, no sunlight enters a room for daylighting purposes when the sun is behind the face of the window wall. This is useful for defining the working time of a given reflector on a given day of the year; the ante-elevation working time is that period between the appearance of the sun around the more easterly side of the window wall and the appearance of the sun at the room's elevation azimuth angle. Likewise, the post-elevation working time is that period between the appearance of the sun at the room's elevation azimuth angle and its disappearance around the more westerly side of the window wall. Second, it has been found that longer total periods of beam daylighting result when at least two stationary reflectors are provided for a given window, one optimized for the ante-elevation sunlight and the other for the post-elevation sunlight.

The final qualitative consideration for defining performance of a reflector is that of the direction of reflection relative to the direction of sunlight. Stationary reflectors cannot continuously provide light along the direction of the perpendicular to the window wall. Over the course of a day, the reflections will either tend toward the same direction as the sunlight or they will tend towards those areas of a room that are distant f rom direct sunlight. In the former case, not much is accomplished, because the direct sunlight is illuminating the portion of the room into which it goes. In the latter case, the reflected light will tend to balance out the light levels with respect to what the direct sunlight provides.

Based on the consideration of general direction of reflected light, the following rules can be assigned for defining good performance of a stationary reflector:

(1) Reflections of ante-elevation sunlight perform well if on average they are towards the more easterly side of the room.

(2) Reflections of post-elevation sunlight perform well if on average they are towards the more westerly side of the room.

A precise expression for performance of a stationary reflector can be made in the form of a performance function having two components, one spatial and the other temporal. The spatial component of the performance function is related to the azimuth angle of reflection (vector r) at a time when the reflection's zenith angle achieves 90°. The temporal component is related to the duration of time that the reflections on a given day result in glare. A high value of performance function thus occurs for far penetration of reflected light at such a time of day that relatively little glare ensues. Optimal performance can be defined as that orientation of reflector that maximizes the performance function. If performance is to be assessed for the period of an entire year, then the performance function must be computed for each day and averaged over the term between successive solstices, since solar position is essentially symmetrical between solstices.

In order to derive the expressions for key components of the performance function, it is necessary to know when (if ever) the reflections from a given orientation of reflector will result in glare in the area receiving beam daylighting on a given day of the year. It is also necessary to know when on a given day of the year the solar position clears the face of the window wall and when it aligns with the elevation azimuth angle of a room. From the latter, the working time available for a stationary reflector on a given day of the year can be found.

The foregoing basic concepts may be applied to calculate the time at which reflections begin to glare down into a room from a given orientation of reflector. In fact, the predicted directions of reflections from arrays having orientations useful for beam daylighting tend to follow a given pattern. When the sun is near the edge of a window wall of a room, the reflections project upwards and close to the windows. As the sun nears the elevation azimuth of a room, the reflections project downward and deeply into the interior of a room. This temporal pattern of reflections holds for both ante- and post-elevation arrays.

For reflectors oriented to provide the type of beam daylighting under consideration, it is thus possible to predict and observe that the transition point at which the reflected beam starts to glare down into the room is the time at which the reflections are parallel to the floor. When the reflected light is parallel to the floor, the zenith angle of reflection is 90°. The component of r along the k direction vanishes at that time (viz. Equation (2c)). Taken together with the fact that in general, because all three vectors are coplanar, $$s \times n = r \times n \quad (15)$$

Equation (15) holds true if and only if the direction cosines of the vector on the left side are identical to the direction cosines of the vector on the right side. When the zenith of reflection achieves 90°, we obtain:

$$n_z s_y - n_y s_z = n_z r_y \quad (16)$$

$$n_x s_z - n_z s_x = -n_z r_x \quad (17)$$

$$ny\ sx - nx\ sy = ny\ rx - nx\ ry \tag{18}$$

Vector r remains a unit vector when its zenith angle achieves 90°, so that the sum of the squares of its components equals unity; this fact may be combined with the results of squaring both sides of Equations (16) and (17) and upon adding the results we obtain after some simplification:

$$(2\ nx\ nz)\ sx + (2\ ny\ nz)\ sy + (2\ nz^2 - 1)sz = 0 \tag{19}$$

The quantities sx, sy and sz may be substituted for those given in Equations (3a), (3b) and (3c) respectively, to give an equation of the form Equation (20). If we specify latitude, Julian day of year and the orientation of the reflector in question, the only unknowns left in Equation (20) are trigonometric functions of hour angle, w:

$$L1 \cos(w) = L2 \sin(w) + L3 \tag{20}$$

where $$L1 = B\ (2\ nz^2 - 1) - 2\ E\ nx\ nz \tag{21}$$

$$L2 = 2\ C\ ny\ nz \tag{22}$$

$$L3 = 2\ D\ nx\ nz - A\ (1 - 2\ nz^2) \tag{23}$$

Equations (21)–(23) contain the constants A, B, C, D and E (from Equations (4)–(8) for a given day and latitude) as well as the components of the vector n. Upon squaring both sides of the transcendental Equation (20) and simplifying, the following quadratic formula is obtained:

$$G1\ X^2 + G2\ X + G3 = 0 \tag{24}$$

where $$G1 = L1^2 + L2^2 \tag{25}$$

$$G2 = 2\ L2\ L3 \tag{26}$$

$$G3 = L3^2 - L1^2 \tag{27}$$

$$X = \sin(w) \tag{28}$$

Taking the inverse sine of the appropriate root of Equation (24) gives the hour angle at which the reflected light has a zenith angle of 90 degrees. The solar hour corresponding to this condition may be found by using Equation (10). Note that if reflections do not attain a zenith angle of 90° on a given day for a given orientation of reflector, Equation (24) will have no real roots.

If conditions are such that Equation (24) does have real roots, then reflection zenith angle achieves 90° on the jth Julian day at a solar time to be called $T_G(j)$. This is a solar time that will be useful in defining the glare component of the performance function. Combining Equations (28) and (10) we obtain:

$$T_G(j) = \frac{12[\mathrm{Sin}^{-1}(X)]}{\pi} \tag{29}$$

Using very similar analytical strategies, the solar hour at which the sun achieves a specific azimuth angle, as, can be found. From the published functions of solar trajectory (DiLaura supra), the relationship between as and the components of the vector s can be found from Equations (2a) and (2b):

$$\tan(as) = \frac{sy}{sx} \tag{30}$$

Working through the substitutions, the following original equation can be derived:

$$\gamma 1\ X^2 + \gamma^2 X + \gamma^3 X = 0 \tag{31}$$

where $$\gamma^1 = C^2 + [E \tan(as)]^2 \tag{32a}$$

$$\gamma^2 = 2\ D\ E \tan(as) \tag{32b}$$

$$\gamma^3 = [D \tan(as)]^2 - C^2 \tag{32c}$$

$$X = \cos(w) \tag{32d}$$

Taking the inverse cosine of the appropriate root of Equation (31) will give the hour angle at which the solar azimuth angle achieves a value of (as) on a given day of the year at a given latitude. This is useful for predicting when the sun appears at the face of a room's window wall and at a room's elevation azimuth angle. The difference between those two times on a given day of the year defines the working time available for a daylighting array.

The constraints of specular reflection can be used in the framework of a coordinate system to solve a number of problems involving time-dependent vectors in three dimensions. The system of equations that result from this analysis form the basis for defining and optimizing what is termed the performance function for stationary reflectors.

The performance function is comprised of a temporal component and a spatial component. Each of the two components is quantified for both ante-elevation and post-elevation periods, making formal use of the conventions and derivations given above.

In order to quantify the temporal component, it is necessary to define the sun's position at four distinct times. The following notations (based on FIG. 2) are used to describe the times on the jth Julian day of the year when, at a given latitude, the sun's positions are as follows:

$T_{EA-90}(j)$ solar time when solar azimuth angle is aligned with the easterly edge of the room's window wall, i.e., when the solar azimuth angle is equal to the room's elevation azimuth angle less ninety degrees.

$T_{EA}(j)$=solar time when solar azimuth angle is equal to the room's elevation azimuth angle.

$T_{EA+90}(j)$=solar time when solar azimuth angle is aligned with the westerly edge of the room's window wall, i.e., when the solar azimuth angle is equal to the room's elevation azimuth angle plus ninety degrees.

$T_G(j)$=solar time at which glare begins (as previously stated and given by Equation (29)).

The temporal component of the performance function, which is concerned with the glare factor and therefore represented by the notation G(j), $$G(j)(\text{ante}) = \begin{cases} \dfrac{T_G(j) - T_{EA-90}(j)}{T_{EA}(j) - T_{EA-90}(j)} \\ \text{if } T_{EA-90}(j) \leq T_G(j) \leq T_{EA}(j) \\ 0 \text{ under all other circumstances} \end{cases} \quad (33a)$$

Similarly, for post-elevation cases, $$G(j)(\text{post}) = \begin{cases} \dfrac{T_G(j) - T_{EA}(j)}{T_{EA+90} - T_{EA}(j)} \\ \text{if } T_{EA}(j) \leq T_G(j) \leq T_{EA+90}(j) \\ 0 \text{ under all other circumstances} \end{cases} \quad (33b)$$

Note that the numerators in the nonzero portions on the right sides of Equations (33a) and (33b) are the times between when sunlight first becomes available and when glare begins, on the jth Julian day of year. The denominators in Equations (33a) and (33b) are simply the working times available to the reflectors on the jth Julian day of the year. In both cases, the nonzero temporal component of the performance function is the fraction of the working time that reflections do not result in glare. In both cases of reflectors useful for daylighting, the zenith angle of reflection is smaller when the sun is near the edge of the window wall than it is when the sun is at the room's elevation azimuth angle. The temporal component thus penalizes glare that starts early during the working time for a given case of reflector. It is bounded between 0 and 1.

The spatial component is a function of the azimuth angle of the reflected beam (vector r) at the time when its zenith angle is 90°, i.e., at solar time $T_G(j)$ In FIG. 2, r' represents the projection of vector r on the x-y plane at time $T_G(j)$ on a day when this projection lies on the ante-elevation side of the window wall. The ante-elevation side of the window wall is located at a position given by the room's elevation azimuth angle minus ninety degrees. The angle between r' and the ante-elevation side of the window wall, i.e., the azimuth angle of vector r with respect to the plane of the ante-elevation side of the window wall, is denoted $r_a$. Likewise, the projection of r on the x-y plane at time $T_G(j)$ on a day when the projection lies on the post-elevation side of the window wall is represented by r". The post-elevation side of the window wall is located at a position given by the room's elevation azimuth angle plus ninety degrees. The azimuth angle of r with respect to the plane of the post-elevation side of the window wall at time $T_G(j)$ is denoted $r_p$.

The spatial component is quantified during periods when r is on the ante-elevation side of the room at time $T_G(j)$ as the difference between the room's elevation azimuth angle (EAA) less 90° and $r_a$ on the jth Julian day when r is on the post-elevation side of the room ar time $T_G(j)$, the spatial component is quantified as the difference between $r_p$ on the jth Julian day and the room's elevation azimuth angle plus 90°. The spatial component is associated with penetration of light into the room and is therefore represented by the notations P (j) (ante) and P (j) (post) for ante- and post-elevation periods, respectively. Thus, on the jth Julian day:

$$P(j)(\text{ante}) = \begin{cases} \dfrac{r_a(T_G(j))}{90^\circ} \\ \text{if } 0^\circ \leq r_a(T_G(j)) \leq 90^\circ \\ 0 \text{ under all other circumstances} \end{cases} \quad (34a)$$

and $$P(j)(\text{post}) = \begin{cases} \dfrac{r_p(T_G(j))}{90^\circ} \\ \text{if } 0^\circ \leq r_p(T_G(j)) \leq 90^\circ \\ 0 \text{ under all other circumstances} \end{cases} \quad (34b)$$

The maximum values of Equations (34a) and (34b) occur on the jth day of year only if the reflections happen to point into the room along a line perpendicular to the window wall at time $T_G(j)$, i.e., if the reflected light goes straight into the room towards the back wall. This is the ideal case of performance and cannot be expected from a fixed reflector for more than a few days in a year. If the reflected light achieves a zenith angle of 90° on the jth day of year but the azimuth of reflection exceeds the limits dictated in Equations (34a) and (34b) , the result is penalized most heavily. The spatial component is bounded between 0 and 1.

The performance function itself is taken as the product of the temporal and spatial components, averaged over the number of days between successive solstices (because the trajectory of the sun is symmetrical with respect to the two half-year periods) . Actually, it is not necessary to calculate the ante- and post-elevation values of G(j) and P(j) for every day between solstices, since a very close approximation is achieved by performing the calculations for each of a number of equally spaced days throughout the solstice. Thus, the performance factor C may be determined separately for ante- and post-elevation periods as follows:

$$C(\text{ante}) = \frac{\Sigma G(j)(\text{ante}) \times P(j)(\text{ante})}{N_j} \quad (35a)$$

$$C(\text{post}) = \frac{\Sigma G(j)(\text{post}) \times P(j)(\text{post})}{N_j} \quad (35b)$$

where $N_j$ is the number of days for which calculations of G(j) and P(j) are performed.

From an examination of the series of equations set forth in the preceding discussion, it will be found that values of G(j) and P(j) , and thus of C, may be calculated if site latitude, room elevation azimuth angle and solar position at any given time on each day are known, and vector n is specifically defined with respect to an established rectangular coordinate system. The net performance of the reflector is thus quantified for each of a number of days and averaged over a term between successive solstices. Determining the maximum value of C, i.e., optimizing the performance function, is thus an iterative process, involving repeated solution of equations 35(a) and 35(b) (and all necessary preceding equations) with a series of different vectors n until the particular vector is found which maximizes C. The process is, of course, expedited by use of a properly programmed digital computer. The actual optimization procedure selected to solve Equations (35a) and (35b) is not as important as the result from the optimization.

Figure 4:
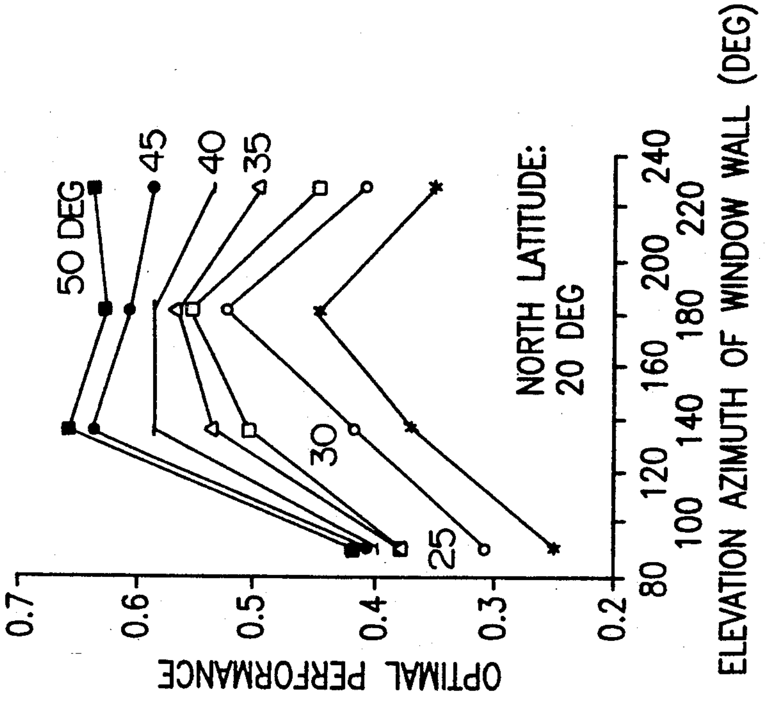
FIGS. 3 and 4 are graphs showing optional performance function values of stationary reflectors at site locations at several north latitudes during ante-elevation and post-elevation periods (as such terms are defined later herein), respectively.
Figure 3:
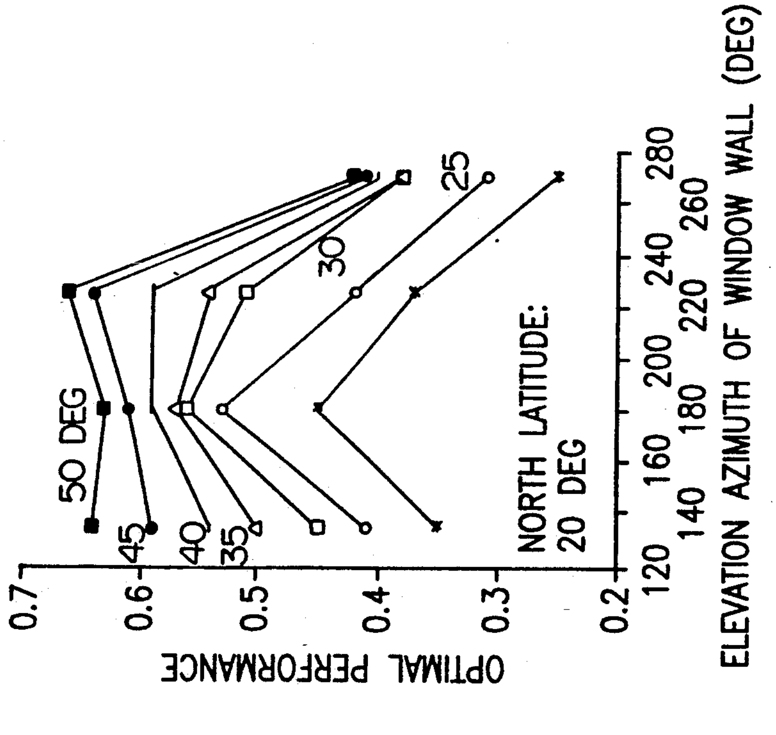

Representative values of optimal performance are plotted as functions of room elevation azimuth angles for a number of latitudes in the U.S., in FIGS. 3 and 4, shows optimal performances for ante- and post-elevation cases, respectively. A very good approximation to optimal orientation of reflector for a given latitude and room elevation azimuth angle can be made for room elevation angles between 130° and 230°. The approximation is based on the azimuth angle of reflector (an) and on the zenith angle of reflector (zn). The components of the vector n are then given by:

$$nx = \sin(zn)\cos(an) \quad (36a)$$

$$ny = \sin(zn)\sin(an) \quad (36b)$$

$$nz = \cos(zn) \quad (36c)$$

Values of n which maximize C in Equations (35a) and (35b) were determined for a number of site latitudes as well as for a number of room elevation azimuth angles. The azimuth and zenith angles of the vector n that gave optimal performance for these cases were systematically examined. Zenith angles of the optimal n vectors showed almost no dependence on site latitude, only on room elevation azimuth angle. The azimuth angles of the optimal n vectors had a more complicated dependence on both room elevation azimuth angle and site latitude.

Customary fitting procedures were applied for the plots of optimal azimuth angle of vector n as a function of room elevation azimuth angle. The types of curve fits included linear, logarithmic, exponential and power functions. Of these, the power function fits consistently gave excellent correlation coefficients (>0.95) for those portions of the plots that are of interest here. The optimal value of reflector azimuth angle (an) for a given room's elevation azimuth angle (EAA) is well approximated by:

$$an = a\,(EAA)^b \quad (37)$$

The values of a and b are given for ante-elevation cases in Table 1, and for post-elevation cases in Table 2. Retain all significant figures when performing calculations with values from Tables 1 and 2. For latitudes that are not listed in Tables 1 and 2, excellent approximations are provided by linear interpolations for the values of the constants. The optimal value of the zenith angle of vector n as a function of room elevation azimuth angle can be found from linear interpolation from Table 3.

The approximations do not hold so well for room elevation azimuth angles less than about 130° and greater than about 230°. For these cases, Equations (35a) and (35b) should be optimized directly.

TABLE 1

Coefficients for Approximation Formula for Optimal Azimuth Angle of stationary Reflectors, at Various U.s. Latitudes. Ante-Elevation Cases.

| Latitude, Degrees North | Coefficients a | Coefficients b |
|---|---|---|
| 20 | 0.0004074 | 2.2872384 |
| 25 | 0.0002352 | 2.4043733 |
| 30 | 0.0006175 | 2.2242912 |
| 35 | 0.0012011 | 2.1056092 |
| 40 | 0.0021152 | 2.0099800 |
| 45 | 0.0019976 | 2.0305734 |

TABLE 1-continued

Coefficients for Approximation Formula for Optimal Azimuth Angle of stationary Reflectors, at Various U.s. Latitudes. Ante-Elevation Cases.

| Latitude, Degrees North | Coefficients a | Coefficients b |
|---|---|---|
| 50 | 0.0023313 | 2.0073444 |

TABLE 2

Coefficients for Approximation Formula for Optimal Azimuth Angle of stationary Reflectors, at Various U.s. Latitudes. Post-Elevation Cases.

| Latitude, Degrees North | Coefficients a | Coefficients b |
|---|---|---|
| 20 | 17.182430 | 0.5508543 |
| 25 | 11.441473 | 0.6258393 |
| 30 | 13.829961 | 0.5889940 |
| 35 | 19.497210 | 0.5200871 |
| 40 | 16.702357 | 0.5471227 |
| 45 | 11.732292 | 0.6126464 |
| 50 | 12.563902 | 0.5969792 |

TABLE 3

Optimal Zenith Angles of stationary Reflectors, at Various Room Elevation Azimuth Angles, for the U.s.

| Room Elevation Azimuth Angle (deg) | Ante-Elevation Cases | Post-Elevation Cases |
|---|---|---|
| 90 | X[1] | 39.8° |
| 135 | 44.7° | 42.3° |
| 180 | 42.9° | 42.9° |
| 225 | 42.3° | 44.7° |
| 270 | 39.8° | X[2] |

[1]For elevation azimuths between 90 and 135 degrees, use zenith angle = 44.7° for ante-elevation cases.
[2]For elevation azimuths between 225 and 270 degrees, use zenith angle = 44.7° for post-elevation cases.

The foregoing discussion has demonstrated how the surface normal vector of a reflecting surface may be oriented to maximize performance of reflections in terms of both temporal and spatial components. This permits design of a beam daylighting system with a single, optimally oriented reflector, or a plurality of like-oriented reflectors. Such a system assumes, of course, that maximum penetration of the reflected beam into the room represents the ideal situation, i.e., optimized performance, in terms of the spatial component. In many applications it will be desirable to provide, in addition to the ref lector (s) having the previously defined optimal orientation, one or more additional reflectors. While such additional reflectors will be, by definition, sub-optimal, they may nevertheless be useful for purposes such as providing a more uniform distribution of light throughout the room, concentrating additional light in one or more specific target areas, avoiding direct beams in some locations, etc.

Figure 5:
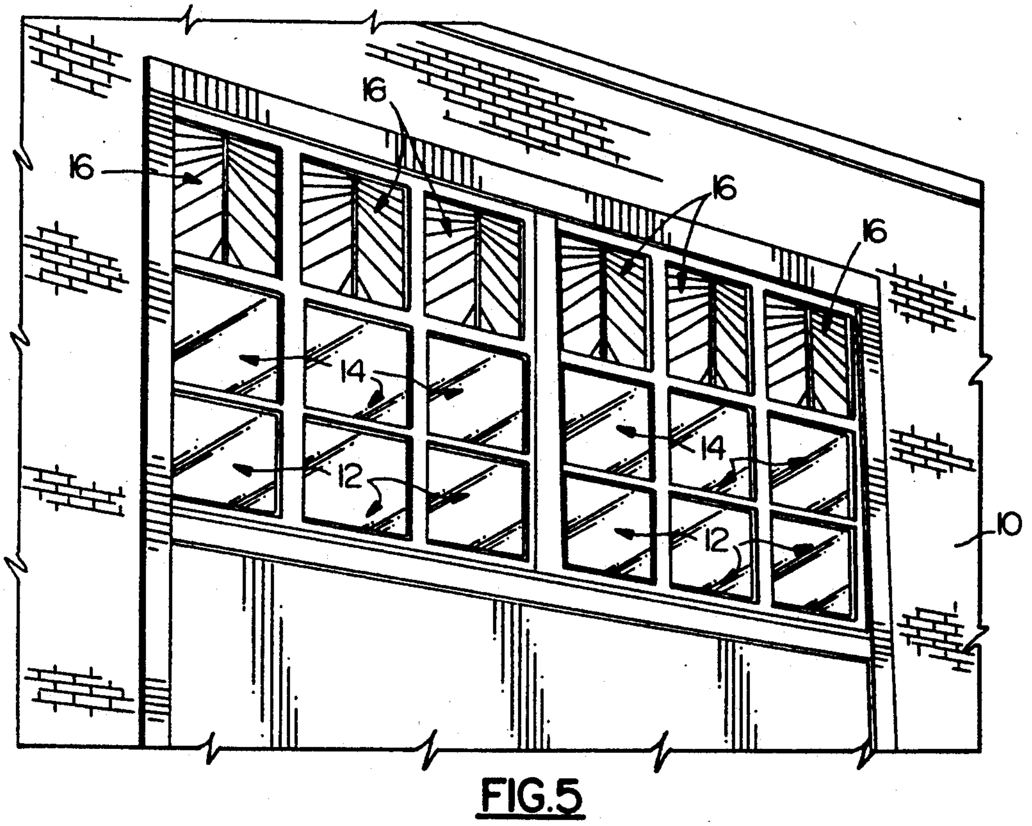
FIG. 5 is a perspective view of a portion of a building wall having window openings equipped with a first embodiment of the daylighting system of the invention.
Figure 6:
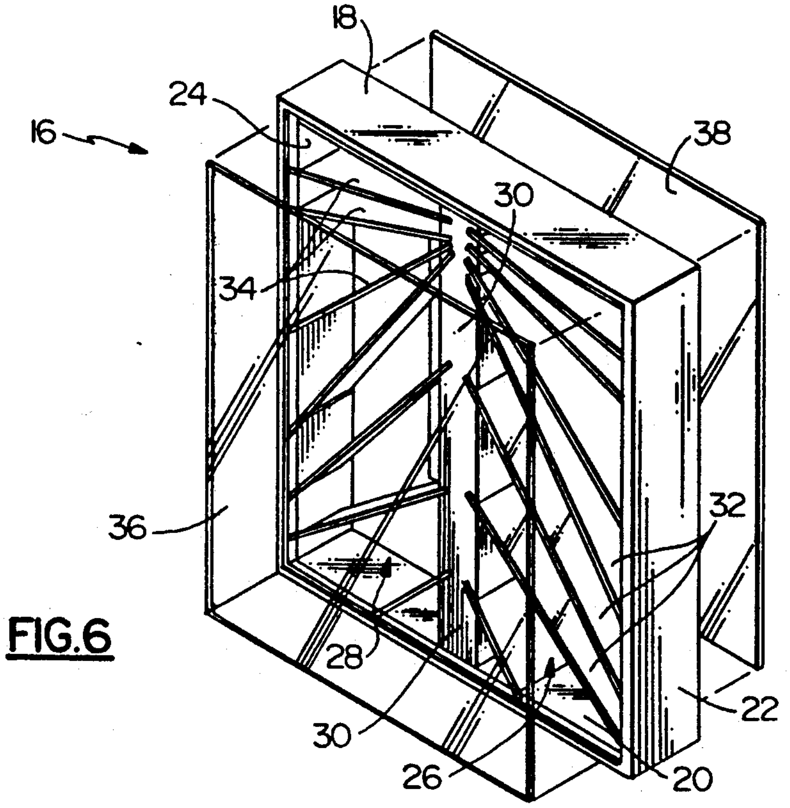
FIG. 6 is a perspective view of a window of the type shown in FIG. 5, incorporating an array of stationary reflectors.

FIGS. 5 and 6 illustrate a simplified version of a window wall fenestration system and a window construction used therein incorporating an array of differently oriented reflectors. Wall 10 is an external wall of the room which receives beam daylighting, facing in a known compass direction at a known site latitude and provided with appropriate openings wherein the windows are mounted. The illustrative system of FIG. 5 includes a plurality of side-by-side windows, each having three vertically stacked sections. Lower and middle sections 12 and 14, respectively, are conventional, transparent paned windows of any suitable design with no reflecting elements. Upper sections 16 are window constructions according to the present invention.

An example of one of sections 16 is shown in more detail in FIG. 6. The surrounding frame is of square or rectangular configuration, including upper and lower portions 18 and 20, respectively, and side portions 22 and 24. The frame portions may be of any suitable construction such as wood or the roll-formed aluminum now common in the insulating glass industry. The frame of section 16 is divided into right and left sections, generally denoted by reference numerals 26 and 28, respectively, by mullion 30.

A first plurality of reflectors 32 are fixedly supported within right section 26 of the frame, and a second plurality of reflectors 34 are fixedly supported in left section 28. Each of reflectors 32 and 34 is, in the illustrated embodiment, of rectangular configuration, having a planar reflecting surface and extending along a longitudinal axis between opposite ends respectively supported by mullion 30 and one of the frame members. The particular means employed for supporting the ends of reflectors 32 and 34 is of no consequence in the present invention, although the orientation of each reflector within the frame,, and consequently with respect to wall 10 and the direction in which it faces, is determined in accordance with the invention. All of reflectors 32 and 34, as well as mullion 30, are positioned between transparent panes 36 and 38, in or parallel to the parallel planes of the front and rear (or outwardly and inwardly facing) sides of the surrounding frame.

In the window construction of FIG. 5, reflectors 32 are orientated to best suit the beam daylighting requirements of the room during ante-elevation periods of solar position; likewise, reflectors 34 are oriented to provide the best beam daylighting during post-elevation periods of solar position. Thus, at least one of reflectors 32 is positioned with the vector n normal to its reflecting surface oriented to maximize the value of C in equation (35a). Likewise, at least one of reflectors 34 is positioned with its vector n oriented to maximize C in equation (35b). The orientations of remaining (sub-optimal) reflectors will depend to some extent upon the desired characteristics of light distribution in the room being illuminated, while ensuring that any glare resulting from the reflections is not so great as to interfere with visual tasks to be performed in the room. It may be noted that the orientations of reflectors 34 will be symmetrical with those of reflectors 32 only when the window wall faces directly south.

It is assumed that the beam daylighting system is intended to provide illumination for performance of a particular visual task, or general type of task, and that the physical parameters of the room and any contents thereof which will have an effect on performance of daylighting are known. For example, the presence of physical obstructions may require the redirection of beams which have been reflected into the room by reflectors 32 and 34. Also, reflections should not be directed upon other visual working surfaces within the room which require direct viewing for performance of the visual task, e.g., blackboards or other such working surfaces. Therefore, it is preferred in many applications that sunlight be reflected into the room along beam paths higher than both the maximum eye height of individuals performing visual tasks within the room and of any working surfaces.

Although considerations governing the orientation of the plurality of reflectors in an array will-vary from one installation to another, an example of a procedure which may be used to determine several orientations of reflectors for an array useful for many circumstances will be given. One observation useful in designing arrays is that the extremes of glare from an optimal reflector orientation occur when the sun is at the room's elevation azimuth angle on the day of the winter solstice. The key consideration in designing an array is to keep any glare from the reflections below a certain acceptable level throughout the year. Of course, even the optimal reflector orientation is not altogether glare-free, but represents the best trade-off between glare and depth of penetration of light. Thus, the following seven-step procedure may be used to obtain the orientations of four suboptimal reflectors in an array:

1. Determine the optimal reflector orientation according to the previously provided information. The vector normal to the surface of the optimally oriented reflector is designated $n_o$.

2. Determine the zenith angle of the sun when it is at the room's elevation azimuth angle on the day of the winter solstice. The vector representing solar position at this time with respect to the reflector is designated $s_o$.

3. Determine the azimuth and zenith angles of the reflection of $s_o$ from $n_o$, which are denoted $a_o$ and $z_o$, respectively.

4. For the same $s_o$, determine the orientation of reflector that gives a reflection with an azimuth angle of $a_o$ and a zenith angle of reflection of $(z_o-10°)$. The vector normal to the surface of this reflector is designated $n_1$.

5. Repeat Step 4, except now find the orientation of reflector that gives a zenith angle of reflection of $(z_o-20°)$. The vector normal to the surface of this reflector is designated $n_2$.

6. Repeat Step 4, except now find the orientation of reflector that gives a zenith angle of reflection of $(z_o-30°)$. The vector normal to the surface of this reflector is designated $n_3$.

7. Repeat Step 4, except now find the orientation of reflector that gives a zenith angle of reflection of $(z_o-40°)$. The vector normal to the surface of this reflector is designated $n_4$.

This procedure produces a set of four orientations of sub-optimal reflectors. Simulations show that the sub-optimal orientations obtained according to this procedure never result in glare throughout the year. Other types of simulations show that there is an increasing spread of azimuth angles of reflections from the four orientations that becomes most pronounced on the day of the summer solstice. The seven steps can specify the orientations for an array of either ante- or post-elevation azimuth applications.

Not all four of the designed orientations need to be implemented in an array. The number of orientations deemed suitable for a given application will depend on other factors such as size of the window. Precedence should be given to the optimal orientation of reflector. Also, there must be enough open space in the array not to block out diffuse daylight on overcast days. Only one or two orientations seem to be necessary for windows that face nearly due east or west, especially in northern latitudes where the average working time available for illumination throughout the year is relatively brief for those compass directions. For rooms that face southeast and southwest, there may be enough of a disparity in orientations between the ante- and post-elevation azimuth halves of a window such that one or more of the four options is rejected to get as close as possible to a visual match of patterns of reflections.

The foregoing discussion has provided a method of determining orientations of stationary reflectors in terms of their surface normal vectors both for reflectors which optimize performance of reflections and for those which are sub-optimal by definition but useful in fulfilling overall beam daylighting objectives. In order to be easily incorporated in existing fenestration systems, the reflectors are preferably incorporated in a window construction such as that of FIG. 6 which, in turn, is mounted in a window wall such as that of FIG. 5. In such systems, all reflectors of each window construction have longitudinal axes lying in a single plane, parallel to the plane of the window wall.

The reflectors are positioned to achieve the desired orientation of their surface normal vector by rotation about two axes, one perpendicular to the window wall and the other its own longitudinal axis. In customary terminology, these would be considered the pitch and roll axes, respectively, of the reflector with respect to the window wall. No rotation about the vertical (yaw) axis is performed for orientation purposes since the reflector must remain with its longitudinal axis in a fixed plane parallel to the window wall. The following discussion will be useful in calculating the pitch and roll angles which will provide the desired orientation of surface normal vectors for reflectors having a known, non-adjustable, yaw angle.

In order to conveniently compute these angles for a given orientation of reflector, the vector n can be multiplied by an appropriate transformation matrix that is a function of window orientation.

Specifically, define an angle $\rho_z$ of room orientation in the x-y plane (from FIG. 2) where the "z" subscript denotes rotation about the z-axis, such that:

$$\rho_z = \textit{Window Elevation Azimuth Angle} - 180^\circ \quad (38)$$

The appropriate transformation matrix is then $|R_z|$ and is defined to be:

$$|R_z| = \begin{vmatrix} \cos\rho_z & -\sin\rho_z & 0 \\ \sin\rho_z & \cos\rho_z & 0 \\ 0 & 0 & 1 \end{vmatrix} \quad (39)$$

A transformed version of n can be defined as n' and can be found by multiplying n by $|R_z|$:

$$n' = n\,|R_z| \quad (40)$$

The components of n' are then given by:

$$n' = nx'\,i' + ny'\,j' + nz'\,k' \quad (41)$$

Note that the coordinate system of the support frame itself, relative to the system shown in FIG. 2, is given by the rectangular notation {i', j', k'}. This is equivalent to a rectangular system rotated by an angle $\rho_z$ about the z-axis relative to the system shown in FIG. 2; thus, the direction k' is equivalent to the direction k in the original system.

In terms of the components of n', the pitch and roll angles may be computed as follows.

$$\text{Pitch Angle} = \text{Tan}^{-1}\left(-\frac{ny'}{nz'}\right) \quad (42)$$

$$\text{Roll Angle} = \text{Tan}^{-1}\left(-\frac{nx'}{nz'}\right) \quad (43)$$

Note that the sign conventions for the descriptive angles of ante- and post-elevation azimuth arrays are defined by the convention of Equation (38).

It will be seen that the pitch and roll angles of a strip of reflector introduce a compound angle where one edge of the reflector intersects the inner edge of the support frame. The strip of reflector intersects an edge of the frame at a slope related to the components of n'. Specifically, the line of intersection of a strip of reflector having a surface normal n' can be found from the vector cross product of n' with the unit vector perpendicular to the inner edge of the frame.

The lines of intersection that n' makes with each of the inner frame edges are:

$$n' \times (-j') = nz'\,i' - nx'\,k' \quad (44)$$

$$n' \times (-k') = -ny'\,i' + nx'\,j' \quad (45)$$

$$n' \times (j') = -nz'\,i' + nx'\,k' \quad (46)$$

$$n' \times (k') = ny'\,i' - nx'\,j' \quad (47)$$

It is interesting to note that if the slope of the line of intersection at the right and left inner edges of the frame is taken to be the change in the z' direction divided by the change in the x' direction; then, from Equations (44) and (47):

$$\frac{\Delta z'}{\Delta x'} = -\frac{nx'}{nz'} \quad (48)$$

This is one way to derive the expression of roll angle given in Equation (43). The pitch angle can be found from the cross product of n' with i'.

Figure 7:
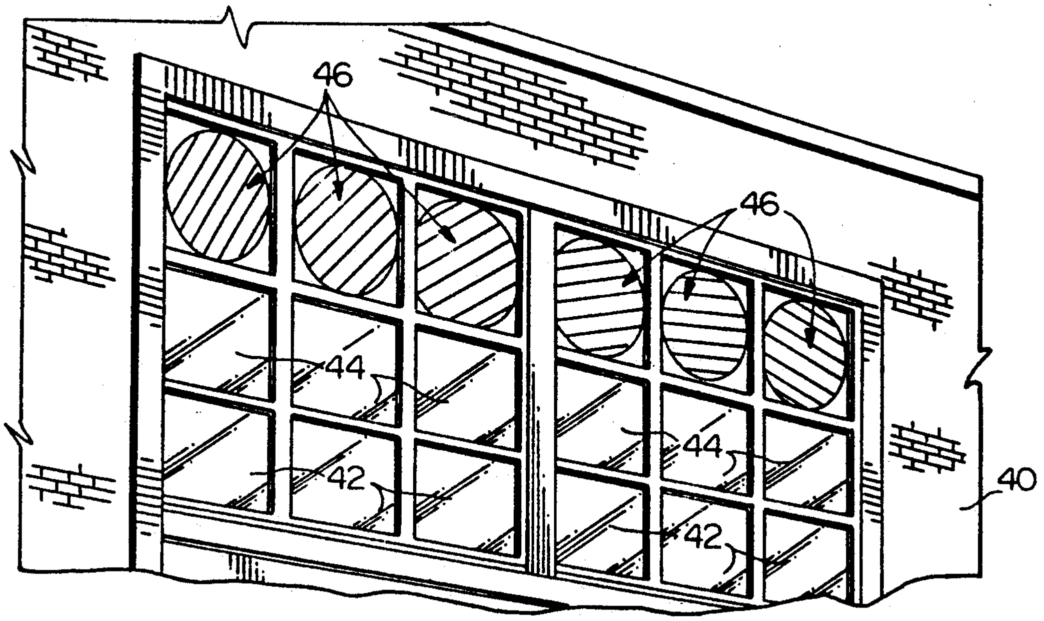
FIG. 7 is a perspective view, as in FIG. 5, illustrating a second embodiment of the invention.

The beam daylighting systems and computational methods disclosed up to this point have been directed to reflectors which are fixedly mounted. A second embodiment of the invention is concerned with reflectors which are rotatable about their pitch and roll axes to maintain the direction of reflected beams substantially fixed as solar position changes. Window wall 40 of FIG. 7 includes a fenestration system similar to that of FIG. 5, having lower and middle sections 42 and 44 comprising conventional, transparent-paned windows. Upper sections 46 comprise window constructions incorporating arrays of planar reflectors mounted in cylindrical-surrounding frames.

Figure 8:
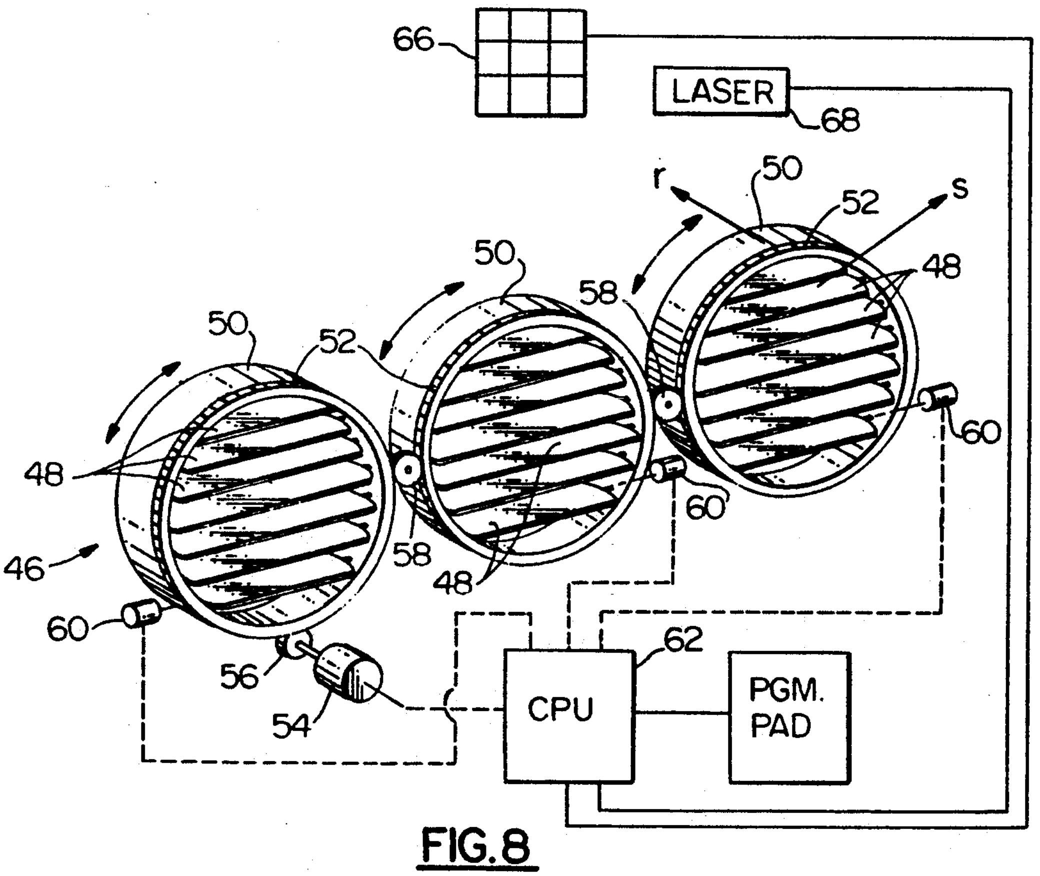
FIG. 8 is a partly diagrammatic, perspective view of a series of windows of the type shown in FIG. 7, incorporating arrays of movable reflectors.

Three horizontally adjacent sections 46 are shown in FIG. 8, each comprising a plurality of reflectors 48 supported within surrounding frame 50 of cylindrical configuration. Each frame 50 is rotatably mounted in a suitable opening in window wall 40, thereby providing collective pitch axis rotation of all reflectors 48 supported within each frame 50. Reflectors 48 are of the same type as reflectors 32 and 34, i.e., rectangular strips having a longitudinal axis and a planar reflecting surface. Reflectors 48 are supported at opposite ends within each of frames 50 for rotation about the respective longitudinal axes of the reflectors; i.e., each of reflectors 48 is rotatable about its roll axis.

Although the present invention is not particularly concerned with the particular means used to rotate the frames and reflectors, a somewhat diagrammatic example is provided in FIG. 8. A portion of the outer periphery of each frame 50 is provided with gear teeth 52 and the output shaft of electrical servomotor 54 is connected to gear 56, which is engaged with teeth 52 of one of frames 50. Each of frames 50 may be independently rotatable by separate motor, or two or more frames 50 may be mutually engaged by one or more gears 58, as illustrated, to impart rotation from one to one or more others of frames 50.

Similarly, means are provided for rotating reflectors 48 about their respective roll axes either individually or collectively. In the illustrated embodiment, servomotors 60 are mounted upon each of frames 50, and each motor 60 is suitably engaged with one of reflectors 48 within the frame on which the motor is mounted. All reflectors 48 within a given frame 50 may be connected to one another for simultaneous rotation about their respective longitudinal (roll) axes, e.g., in the nature of conventional Venetian blinds. Also, all reflectors 40 within a given frame 50 may be rotated by equal amounts in response to rotation imparted to one reflector, or a desired amount of unequal rotation may be imparted by, for example, suitable gearing arrangements.

The object of using movable reflectors will, in most cases, be to maintain the distribution of reflected light within the room in a substantially constant pattern throughout times that beam daylighting is provided. Thus, in order to direct reflected beams to a specific target area, a reflector must be rotated to change the orientation of its surface normal vector as the relative solar position changes throughout each day. That is, using previous conventions, in order to maintain vector r substantially constant, vector n must be reoriented to conform to changes in vector s. With a window wall facing in a known compass direction at a known site latitude, the time-dependent orientation of vector n and the changes in pitch and roll angles of reflectors having a known yaw angle may be determined in accordance with the previous discussion.

It is preferred that the electrical signals to which motors 54 and 60 are responsive be controlled by preprogrammed instructions from a computer such as the schematically indicated CPU-based controller 62. Controller 62 may be programmed by conventional techniques, utilizing the information set forth herein. However, a thoroughly reliable and intervention-free system of control may be achieved with artificial intelligence techniques within the current state of the art. Such techniques involve the use of so-called neural networks capable of adaptively handling many parameters at once to accomplish a goal and are described, for example, in "A Universal Optimization Network" by Harth, et al, *Proceedings of the Special Symposium on Maturing Technologies and Emerging Horizons in Biomedical Engineering, IEEE* (pp. 87-89, 1988).

Programming pad 64, solar beam sensing array 66 and directional locating laser gear 68 are connected to the CPU in order to initialize the system. Rough estimates of site latitude, solar time and compass direction of the window wall, together with the date, are entered into the CPU by means of programming pad 64. The locating laser indicates the desired direction of the reflected beam during routine operation. Sensor array 66 is placed next to locating laser 68 at the desired target location for verification of the direction and intensity of reflected light. The neural network then starts to refine the rough estimates previously entered as it "trains" over the course of one sunny day, throughout which the neural network causes the reflectors to project the beam toward sensor array 66. Optimal operation of the neural network is determined by optimal illumination of sensor array 66 under sunny conditions. When performance of the neural network is satisfactory, the end of initialization is signaled. The system is then ready to provide years of intervention-free illumination of the target area. Of course, various reflectors or arrays may be directed to different target areas, in which case separate initialization is performed for each area.

Although natural light is preferable to artificial light for a number of reasons in addition to energy conservation, as previously pointed out, it is nevertheless desirable that energy consumed in moving an array of reflectors be less than the energy saved by supplanting artificial with natural light. To this end, particular attention should be given to optimizing efficiency of the mounting and actuating elements in beam daylighting systems employing movable reflectors. Power can be supplied from batteries charged by solar-tracking photovoltaic cells and/or standard 110 VAC. Specialized control systems ensure minimum power of motion; theoretical development of such control is presented in "Physical Principles For Economies of Skilled Movements" by W. L. Nelson, *Biological Cybernetics* 46 135-147 (1983).

From the foregoing, it will be seen that the present invention provides beam daylighting systems and window constructions utilized therein which are much more efficient in terms of illuminating a room, or selected areas thereof, than prior art systems of this class. The invention encompasses both stationary and movable reflectors, and arrays thereof. With regard to stationary reflector arrays, the invention further provides a novel and very useful method of optimizing performance of reflections for beam daylighting purposes.

What is claimed is:

1. Apparatus for providing beam day-lighting to a room having an exterior envelope a portion of which faces in a compass direction to receive direct sunlight for at least a period during each day of at least a portion of the year, said apparatus comprising:
   a) a member having a light-reflecting surface;
   b) means defining an opening in said portion of said envelope; and
   c) means supporting said member in said opening in an orientation wherein all directional components of a vector normal to said surface have values other than zero in all of three mutually perpendicular coordinate directions, of which one is perpendicular to the plane of said opening and the other two are in the plane of said opening.

2. The apparatus of claim 1 wherein substantially all of said reflecting surface is planar.

3. The apparatus of claim 1 wherein said supporting means fixedly positions said member in said opening.

4. The apparatus of claim 1 wherein said member has a longitudinal axis in said plane of said opening.

5. The apparatus of claim 4 wherein said opening is in a substantially vertical plane and said longitudinal axis is oriented in other than either horizontal or vertical.

6. Apparatus for providing beam day-lighting for illumination of an area wherein one or more individuals are positioned at a predetermined maximum eye height to perform visual tasks involving direct viewing of a working surface, said area being located in an enclosed space having an exterior envelope a portion of which faces in a predetermined compass direction at a predetermined site latitude, said envelope having surface portions surrounding an opening, said apparatus comprising:

a) at least one opaque member having a highly specular, light-reflecting surface; and b) means supporting said member in said opening with said reflecting surface in a position to receive direct sunlight for at least a period during each day of at least a portion of the year, and to reflect said sunlight not more than once into said enclosed space along beam paths which optimize performance of reflections in terms of both temporal and spatial components averaged over the period between successive solstices at locations in said enclosed space higher than that of both said maximum eye height and said working surface.

7. The apparatus of claim 6 wherein at least a predetermined portion of said light-reflecting surface is planar and all directional components of a vector normal to said predetermined portion have values other than zero in all of three mutually perpendicular coordinate directions, a first of which is perpendicular to the plane of said opening and the second and third of which are in the plane of said opening.

8. The apparatus of claim 6 wherein said opaque member has a longitudinal axis in the plane of said opening.

9. The apparatus of claim 8 wherein said supporting means fixedly position said member in said opening in an orientation wherein said longitudinal axis is other than either horizontal or vertical.

10. The apparatus of claim 9 wherein at least a first and a second opaque member are fixedly supported in said opening, each of said members having a longitudinal axis in the plane of said opening.

11. The apparatus of claim 10 wherein said first and second opaque members are oriented to optimize said performance of reflections during ante-elevation and post-elevation periods, respectively.

12. The apparatus of claim 11 and further including first and second pluralities of opaque members each having a light-reflecting surface, said first and second pluralities respectively including said first and second members, all of said members having a longitudinal axis in the plane of said opening and oriented other than either horizontally or vertically.

13. A beam daylighting system for a room having a window wall facing in a predetermined compass direction at a known latitude providing direct sunlight to said window wall on at least some days during both ante-elevation and post-elevation periods when solar position is on easterly and westerly sides, respectively, of a line perpendicular to said window wall, said system comprising, in combination:

a) first and second opaque members, each having a highly specular surface;

b) first support means fixedly positioning said first member in an opening in said window wall to receive direct sunlight on said surface and reflect said sunlight not more than once into said room along beam paths which optimize performance of reflections in terms of both temporal and spatial components averaged over the period between successive solstices during said ante-elevation periods; and c) second support means fixedly positioning said second member in an opening in said window wall to receive direct sunlight on said surface and reflect said sunlight not more than once into said room along beam paths which optimize performance of reflections in terms of both temporal and spatial components averaged over the period between successive solstices during said post-elevation periods.

14. The beam daylighting system of claim 13 wherein said specular surface of each of said opaque members is substantially planar.

15. The beam daylighting system of claim 14 wherein each of said first and second members has a longitudinal axis in the plane of said opening.

16. The beam daylighting system of claim 15 wherein each of said first and second members extend between opposite ends and are fixedly supported by said first and second support means, respectively, at each of said ends.

17. The beam daylighting system of claim 16 wherein said first and second support means each include portions of a rectangular frame.

18. The beam daylighting system of claim 17 wherein said first and second members are supported in laterally spaced positions within said frame.

19. The beam daylighting system of claim 18 wherein said first and second support means respectively comprise first and second substantially rectangular frames mounted in side-by-side relation in said opening.

20. The beam daylighting system of claim 19 wherein said frames each have front and rear sides respectively bounded by first and second, parallel planes, said first and second members being positioned entirely between said first and second planes.

21. The beam daylighting system of claim 20 and further including a pair of transparent panes closing said front and rear sides of said frames on opposite sides of said first and second members.

22. A window construction for installation in an opening in an exterior wall facing in a predetermined compass direction at a known latitude to provide beam daylighting to a room bounded on one side by said exterior wall, said window construction comprising:

a) a surrounding frame structure having front and rear sides bounded by parallel, first and second planes;

b) first and second opaque members each having a longitudinal axis extending between first and second ends and a highly specular surface; and c) means supporting said members within said surrounding frame structure with said longitudinal axis of each of said members in a third plane between and parallel to said first and second planes, and with said specular surfaces of said first and second members respectively oriented to optimize performance of reflections of sunlight into said room in terms of both temporal and spatial components during ante-elevation and post-elevation periods of solar position with respect to a line perpendicular to said parallel planes when said frame structure with said first and second members supported therein is installed in said opening.

23. The window construction of claim 22 and further including a pair of transparent panes supported upon said frame structure in planes substantially parallel to said first and second planes and on opposite sides of said first and second members.

24. The window construction of claim 22 wherein said frame structure defines a substantially rectangular, enclosed area.

25. The window construction of claim 22 wherein said frame structure defines a substantially circular, enclosed area.

26. The window construction of claim 22 and further including a mullion extending across and dividing said frame structure into first and second portions wherein said first and second members are respectively supported.

27. The window construction of claim 26 wherein said mullion forms a part of said supporting means.

28. A method of optimizing the performance of reflections of direct sunlight into a room for beam daylighting purposes from a reflecting surface of a member supported in a planar opening in an exterior wall of said room, said method comprising:

a) defining a rectangular coordinate system having first, second and third mutually perpendicular axes, said first and second axes lying in a horizontal plane and being perpendicular and parallel, respectively, to the plane of said opening, and said third axis being vertical;
b) determining the geographic latitude of said room, and the compass direction in which said exterior wall faces, thereby defining the vector s representing solar position with respect to said member in said coordinate system at all times during each day; and
c) positioning said surface with the vector n normal thereto oriented with three nonzero components in said rectangular coordinate system and the vector r of solar beams reflected by said member into said room optimized in terms of both temporal and spatial components.

29. The method of claim 28 wherein said positioning step includes fixedly supporting said member within said opening with vector n oriented to optimize performance of reflections along vector r in terms of both temporal and spatial components averaged over the period between successive solstices.

30. The method of claim 29 wherein said member is supported with vector n oriented to optimize said performance of reflections during periods when vector s is on the easterly side of said first axis, and including the further step of fixedly supporting a second member in said opening with the vector n' normal to the reflecting surface of said second member oriented with three nonzero components in said rectangular coordinate system and the vector r' of solar beams reflected by said second member into said room optimized in terms of both temporal and spatial components averaged over the period between successive solstices during periods when vector s is on the westerly side of said first axis.

31. The method of claim 28 wherein said member is movably supported in said opening, and including the further step of moving said member to vary the orientation of vector n commensurately with changes in vector s to maintain vector r substantially constant throughout at least a predetermined portion of at least some days.

32. The method of claim 31 wherein said member has a longitudinal axis and is supported with said longitudinal axis in the plane of said opening, said step of moving said member comprising rotating said member about at least one of said longitudinal axis and an axis parallel to said first axis.

33. The method of designing an array of reflectors each having a planar reflecting surface and a longitudinal axis for positioning in an opening disposed in a vertical plane in an exterior wall facing in a known compass direction at a known site latitude to provide beam daylighting to a room partially bounded by said wall, said method comprising:

a) defining a rectangular coordinate system having first, second and third mutually perpendicular axes, said first and second axes lying in a horizontal plane and being perpendicular and parallel, respectively, to the plane of said opening, and said third axis being vertical;
b) determining the components within said coordinate system of a vector $n_o$ normal to the reflecting surface of a first reflector of said array which optimizes performance of reflections in terms of both temporal and spatial components during one of ante-elevation and post-elevation periods, when solar position with respect to said opening is on easterly and westerly sides, respectively, of a line perpendicular to the plane of said opening averaged over the period between successive solstices;
c) determining the elevation azimuth angle between compass direction north and said known compass direction;
d) determining for any day of the year at said site latitude the solar time at which the sun is at said elevation azimuth angle;
e) determining the zenith angle of the vector $s_o$ representing solar position with respect to said first reflector at the time when the sun is at said elevation azimuth angle on the day of the winter solstice;
f) determining the azimuth and zenith angles, $a_o$ and $z_o$, respectively, of reflections of $s_o$ from $n_o$; and
g) determining the components within said coordinate system of the components of a vector $n_1$ normal to the reflecting surface of a second reflector of said array which provides reflections having an azimuth angle $a_o$ and a zenith angle $z_1$ a predetermined number of degrees smaller than $z_o$ at solar position $s_o$.

34. The method of claim 33 and including the further step of fixedly supporting said first and second reflectors within said opening with the surface normal vectors of the respective reflecting surfaces oriented at $n_o$ and $n_1$, respectively.

35. The method of claim 34 wherein each of said first and second reflectors has a longitudinal axis and is supported with said longitudinal axis parallel to said plane of said opening.

36. The method of claim 33 and including the further step of determining the components within said coordinate system of vectors $n_2 \ldots n_n$ normal to the respective reflecting surfaces of a plurality of additional reflectors of said array wherein all of said reflectors provide reflections having an azimuth angle $a_o$ and successive ref lectors provide reflections having respective zenith angles $z_2 \ldots z_n$ each of which is smaller than that of the preceding reflector, all at solar position $s_o$.

37. The method of claim 36 wherein successive ref lectors provide reflections having respective zenith angles smaller than that of the immediately preceding reflector by said predetermined number of degrees.

38. The method of claim 37 and including the further step of fixedly supporting said additional reflectors within said opening with the surface normal vectors of the respective reflecting surfaces of successive reflectors of said array oriented at $n_2 \ldots n_n$, respectively.

39. An array of reflectors mounted in a substantially planar opening of an exterior wall of a room, said wall facing a known compass direction and said room being at a known geographic latitude, to provide beam daylighting at a location within said room without significant glare during both ante-elevation periods, when solar position with respect to said array is on the easterly side of a line perpendicular to said wall, and post-elevation periods, when solar position with respect to said array is on the westerly side of said line, said array comprising:

a) at least one first reflector having a first longitudinal axis and first, highly specular, substantially planar reflecting surface;

b) first support means fixedly supporting said first reflector within said opening with said first longitudinal axis in a plane parallel to the plane of said opening and with said first reflecting surface positioned with the vector normal thereto oriented to provide optimized performance of reflections during said ante-elevation periods in terms of both temporal and spatial components averaged over the period between successive solstices;

c) at least one second reflector having a second longitudinal axis and a second,, highly specular, substantially planar reflecting surface; and d) second support means fixedly supporting said second reflector within said opening with said second longitudinal axis in a plane parallel to the plane of said opening and with said second reflecting surface positioned with the vector normal thereto oriented to provide optimized performance of reflections during said post-elevation periods in terms of both temporal and spatial components averaged over the period between successive solstices.

40. The array of reflectors of claim 39 and further including a first plurality of additional reflectors each having a longitudinal axis and a respective, highly specular reflecting surface and supported within said opening with said longitudinal axis of each in a plane parallel to the plane of said opening, the respective reflecting surface of each reflector of said first plurality being positioned with the vector normal thereto oriented to provide optimized performance of reflections in terms of temporal components and predetermined, sub-optimized performance of reflections in terms of spatial components during said ante-elevation periods averaged over the period between successive solstices.

41. The array of reflectors of claim 40 and further including a second plurality of additional reflectors each having a longitudinal axis and a respective, highly specular reflecting surface and supported within said opening with said longitudinal axis of each in a plane parallel to the plane of said opening, the respective reflecting surface of each reflector of said second plurality being positioned with the vector normal thereto oriented to provide optimized performance of reflections in terms of temporal components and predetermined, sub-optimal performance of reflections in terms of spatial components during said post-elevation periods averaged over the period between successive solstices.

42. The array of reflectors of claim 41 and further including a surrounding frame mounted in said opening, and said first and second support means comprising first and second portions, respectively, of said frame.

43. The array of reflectors of claim 42 wherein said frame includes front and rear sides respectively bounded by first and second planes parallel to the plane of said opening, and all of said reflectors lie entirely between said first and second planes.

44. The array of reflectors of claim 43 and further including a pair of transparent panes supported within said frame on opposite sides of said reflectors, said panes respectively closing said front and rear sides of said frame.

45. The array of reflectors of claim 43 and further including a mullion extending across said frame and dividing the latter into said first and second portions.

46. The array of reflectors of claim 45 wherein each of said reflectors extends between first and second ends one of which is supported by said mullion and the other of which is supported by said frame.

47. An array of reflectors mounted in a substantially planar opening of an exterior wall of a room, said wall facing in a known compass direction to receive direct sunlight for a period during each day of at least a portion of the year, and said room being at a known geographic latitude, to provide beam daylighting at a target area within said room, said array comprising:

a) a frame structure surrounding a defined area;

b) a plurality of reflectors each having a longitudinal axis and a highly specular reflecting surface;

c) means supporting said ref lectors within said frame for rotation about said longitudinal axis of each reflector;

d) means supporting said frame structure in said opening with said defined area and said opening in parallel planes for rotation about a fixed axis perpendicularly intersecting said defined area; and e) motive means for effecting rotation of said reflectors about said longitudinal axis of each and of said frame about said fixed axis in a manner directing solar beams reflected by said reflectors to illuminate said target area without objectionable glare throughout changes in solar position with respect to said reflectors.

48. The array of reflectors of claim 47 wherein said frame structure is substantially cylindrical and said defined area is circular.

49. The array of reflectors of claim 48 wherein said longitudinal axis of each of said reflectors is in a plane parallel to said plane of said opening and parallel to said longitudinal axis of each of the others of said reflectors.

50. The array of reflectors of claim 47 and further including computerized control means for said motive means.

51. The array of reflectors of claim 50 wherein said control means includes a neural network and initializing means permitting said neural network to respond to actual changes in solar position.

52. The array of reflectors of claim 50 wherein said motive means includes at least first and second electrical motor means for effecting rotation of said reflectors and said frame, respectively, each of said motor means being responsive to signals from said control means.

* * * * *